United States Patent [19]
Bhatnagar et al.

[11] Patent Number: 5,165,989
[45] Date of Patent: Nov. 24, 1992

[54] EXTENDED SHELF LIFE PREPREG ARTICLE AND METHOD

[75] Inventors: Ashok Bhatnagar, Chester; David S. Cordova, Midlothian; Leroy C. Lin, Chesterfield, all of Va.

[73] Assignee: Allied-Signal Inc., Morris Township, Morris County, N.J.

[21] Appl. No.: 445,569

[22] Filed: Dec. 4, 1989

[51] Int. Cl.⁵ .................................................. B32B 4/00
[52] U.S. Cl. ..................................... 428/245; 428/265; 428/408; 428/411.1; 428/286; 523/465
[58] Field of Search ............... 428/268, 245, 408, 286, 428/411.1; 523/465

[56] References Cited
PUBLICATIONS

Modern Plastics Encyclopedia; (Oct. 1990) (pp. 66–67); article by Richard Miller.

*Primary Examiner*—Patrick J. Ryan
*Assistant Examiner*—Richard C. Weisberger

[57] ABSTRACT

An essentially tack free prepreg article, characterized by a shelf life at about 25° C. of at least about three months, and method of making the same are provided. The prepreg article comprises at least one network of fibers which has been impregnated with a solution of a resin in styrene and a catalyst. The resin is curable by the catalyst at a temperature above about 90° C. The impregnated network is dried for a length of time and at a temperature sufficient to reduce the styrene content to less than about 1% by weight of the impregnated network without curing the resin. The prepreg article can subsequently be used as a component in a molded composite.

18 Claims, No Drawings

EXTENDED SHELF LIFE PREPREG ARTICLE AND METHOD

BACKGROUND OF THE INVENTION

1. Field of the Invention

This invention relates to a prepreg article characterized by an extended shelf life of at least about three months at about 25° C. for use in composites. More particularly, it relates to an essentially tack free prepreg article characterized by an extended shelf life of at least about three months at about 25° C. for use in rigid, thermoset composite articles for structural, high impact and ballistic end uses. 2. Prior Art Thermoset resin-containing solutions, or systems, for impregnating or coating reinforcing materials such as fibers for subsequent use in composites are known. These solutions typically comprise a resin, a catalyst for curing the resin, a solvent for adjusting the viscosity of the solution and a monomer for reacting with the polymer. The solvent and monomer are often the same entity, typically styrene.

A "prepreg" is at least one network of fibers, impregnated with just such a thermoset resin-containing solution, or system, but left uncured. Unfortunately, the prepregs impregnated with a styrene-containing system have a shelf life of only about two weeks and are very tacky to the touch at room temperature (about 25° C.). The short shelf life is due to the fact that the styrene is unstable at room temperature and it evaporates from the thermosetting resin; once this develops, the prepreg can no longer be used as contemplated. The prior art addressed this problem by refrigerating or freezing the prepreg to extend its shelf life. However, the shelf life of a refrigerated or frozen prepreg is only about three months, and a refrigerated transport system for the prepregs is expensive.

The present invention was developed to overcome the deficiencies of the prior art.

BRIEF DESCRIPTION OF THE INVENTION

This invention is an article of manufacture for use in composites comprising at least one network of fibers, each network being impregnated with a solution and then dried. The solution comprises a thermosetting resin, a catalyst and styrene. The resin is curable by the catalyst at a temperature above about 90° C. The impregnated network is dried for a length of time and at a temperature sufficient to reduce the styrene content to less than about 1% by weight of the impregnated network without curing the resin. The dried, impregnated network is known as a "prepreg". The prepreg of the present invention can be plied together with other prepregs and cured to form a rigid composite without cooling the mold.

The method of this invention is a method to manufacture a prepreg, characterized by a shelf life at about 25° C. of at least three months, for use in a composite. The method comprises the steps of: preparing at least one network of fibers; impregnating each of the networks with a solution of a thermosetting resin, a catalyst, and styrene, the resin being curable by the catalyst at a temperature above about 90° C.; and drying the impregnated network for a length of time and at a temperature sufficient to reduce the styrene content to less than about 1% by weight of the impregnated network without curing the resin.

Reduction of the styrene during formation of the prepreg combined with the use of the catalyst results in longer shelf life for the prepreg, equal or better composite performance when compared to a composite made according to the prior art, little or no styrene emissions during the drying stage, and better control and reproducibility during the curing steps which can follow.

DETAILED DESCRIPTION OF THE INVENTION

This invention in detail is an article of manufacture (prepreg) for use in composites for structural, high impact and ballistic end uses, comprising at least one network of fibers, each network being first impregnated with a solution comprising a thermosetting resin, a catalyst, and styrene. The impregnated network is then dried for a length of time and at a temperature sufficient to reduce the styrene content to less than about 1% by weight of the impregnated network without curing the resin.

The preferred drying temperature ranges from about 65° to 85° C., more preferably 70° to 80° C., most preferably about 75° C. The preferred drying time ranges from about fifteen minutes to about forty-five minutes, more preferably from about thirty-five minutes to about forty-five minutes, most preferably about forty-five minutes.

The prepreg is preferably cured at a temperature above about 90° C. to form a rigid composite. The preferred number of prepregs in the final composite ranges from about 2 to 400, more preferably from about 4 to about 80, and prepregs utilizing different fibers and/or resins may be combined.

For fiber herein, is meant an elongate body the length dimension of which is much greater than the transverse dimensions of width and thickness. Accordingly, the term fiber includes monofilament, multifilament, ribbon, strip, staple and other forms of chopped or cut fiber and the like having regular or irregular cross-sections.

The preferred fiber is characterized by a high modulus and a high strength. By a high modulus is meant a tensile modulus of from about 400,000 psi ($2.75 \times 10^9$ Pa) to about $100 \times 10^6$ psi ($6.89 \times 10^{11}$ Pa) (at least about 30 grams per denier) and by a high strength is meant a tensile strength of from about 100,000 to 1,000,000 psi ($6.89 \times 10^8$ to $6.89 \times 10^9$ Pa) (at least about 8 grams per denier). The fiber is preferably selected from the group consisting of high molecular weight polyethylene, aramids (including Kevlar), high molecular weight polypropylene, quartz, graphite, glass (including E-glass and S-glass), carbon, metals, alumina, nylon, polyester, liquid crystals, polyvinyl alcohol, and combinations thereof, among others. The most preferred fibers are high molecular weight polyethylenes, aramids, and liquid crystals.

By network is meant fibers arranged in configurations of various types. For example, the plurality of fibers can be grouped together to form a twisted or untwisted yarn. The fibers of yarn may be formed as a felt, knitted or woven (plain, basket, satin and crow feet weaves, etc.) into a network, fabricated into a non-woven fabric (random or ordered orientation), arranged in a parallel array, layered, or formed into a fabric by any of a variety of conventional techniques.

The preferred thermosetting resin is a high modulus resin selected from the group consisting of phenolics, polyesters (preferably unsaturated), epoxies, interpenetrating polymer networks (hereafter IPN resins), vinyl esters, rigid polyurethanes, polyimides and mixtures or co-polymers thereof. The most preferred high modulus resins are polyesters, vinyl esters, polyurethanes and IPN resins. By high modulus resin is meant a resin having a tensile modulus of about 5,000 to 100,000 psi ($3.4 \times 10^7$ to $6.89 \times 10^8$ Pa).

The catalyst may cure the resin at above about 90° C. itself or with the aid of a promotor. Obviously, the curing temperature must be lower than the degradation temperature of the reinforcing materials and resin. Suitable catalysts, by way of example, include: tert-butyl perbenzoate, 2,5-dimethyl-2,5-di-2-ethylhexanoylperoxyhexane, benzoyl peroxide and combinations thereof. A suitable catalyst with promotor, by way of example, includes tert-butyl perbenzoate with PEP 308 (an organometallic complex promoter commercially available from Air Products), which is the preferred system.

By cured is meant the transition from a less rigid to a more rigid state as by cross-linking, with or without catalyst, usually with heat. By rigid is meant stiff in that the prepreg has structural integrity and can stand alone.

The resin matrix also may include enhancers, mold release agents and fillers, as are known in the composite art, in addition to the fiber networks and resins.

The method of this invention is a method to manufacture a prepreg, characterized by a shelf life at about 25° C. of at least three months, for use in a rigid composite for semistructural, high impact and ballistic end uses. The steps comprise preparing at least one network of fibers, preferably of high strength and high modulus as previously described; impregnating the networks with a solution of a thermosetting resin, a catalyst, and styrene, all as previously described; and drying the impregnated network for a length of time and at a temperature sufficient to reduce the styrene content to less than about 1% by weight of the impregnated network without curing the resin.

By structural, high impact and ballistic end uses is meant industrial and military composite applications such as composites used in aircraft, vehicles, ships, sports equipment and other applications.

The benefits of this invention over the prior art are:

1. The prepreg article of the present invention has a shelf life at about 25° C. of at least three months, preferably of at least six months, and most preferably of at least twelve months. This permits transportation of the prepreg without refrigeration. In fact, prepreg articles of the present invention can still be used after exposure to temperatures as high as about 75° C. for as long as a day, e.g., in an uncooled transporting truck.

2. The prepreg of the present invention is essentially tack free to the touch at a temperature of about 25° C. The prepregs of the prior art were difficult to separate at about 25° C. due to their tackiness.

3. The prepreg of the present invention can be used to form composites with structural, high impact and ballistic properties substantially similar to those of composites formed in a wet lay-up process, but without the mess and inability to control resin and catalyst content consistently.

In the examples which follow, the degree of tack was determined by touch and by difficulty in separating stacked prepregs. Styrene content was determined by the change in prepreg weight due to drying, and in all examples of the present invention was reduced to less than about 1% by weight of the impregnated network (prepreg).

Studies of ballistic composites frequently employ a 22 caliber, non-deforming steel fragment of specified weight, hardness and dimensions (Mil-Spec. MIL-P-46593A(ORD)). The protective power of a structure is normally expressed by citing the impacting velocity at which 50% of the projectiles are stopped, and is designated the $V_{50}$ value.

Usually, a composite armor has the geometrical shape of a shell or plate. The specific weight of the shells and plates can be expressed in terms of the areal density (ADT). This areal density corresponds to the weight per unit area of the structure. In the examples, the areal density refers to the total panel weight divided by the surface area of the panel.

EXAMPLE 1

Comparative

SPECTRA ® 1000 yarn, an extended chain polyethylene fiber commercially available from Allied-Signal Corporation, was woven into fabric style 952 (plain weave 34×34 ends/inch). The fabric was then coated with a solution containing about 49.44% by weight DERAKANE 411-45 (an epoxy-based vinyl ester resin which includes about 45% styrene and is commercially available from Dow Chemical) mixed with 0.60% by weight 2,5-dimethyl- 2,5-di-2-ethylhexanoylperoxyhexane (commercially available from Pennwalt Corporation as Lupersol 256), 24.98% by weight of acetone, and 24.98% by weight of isopropyl alcohol. The fabric was not dried to reduce styrene content, which was in excess of 1% by weight of the impregnated network. After about two weeks of storage at a temperature of about 25° C., this prepreg had a very high viscosity, so that it could not be used in forming a laminate.

EXAMPLE 2

A fabric constructed as in Example 1 was coated with the same solution as in Example 1. The fabric was dried at 75° C. for forty-five minutes. The resin content (solids basis) of the prepreg was 20 percent. Thirty (30) layers of this prepreg were pressed (molded) at 220° F. (104° C.), 400 psi ($2.75 \times 10^6$ Pa), for about 10 minutes. The laminate had an areal density of 1.70 pounds per square foot (hereafter psf) (8.5 kg/m$^2$). The $V_{50}$ of the laminate was 1978 feet per second (hereafter fps) (603 m/s).

EXAMPLE 3

Other prepregs prepared at the same time and in the same fashion as those of Example 2 were shelved for about six months at about 25° C. Thirty layers of this prepreg were pressed using the conditions of Example 2. The laminate had an areal density of 1.68 psf (8.4 kg/m$^2$). The $V_{50}$ of the laminate was 1965 fps (599 m/s).

EXAMPLE 4

The prepregs of Example 3 which were not used in that Example were shelved for about an additional six months (total about twelve months) at about 25° C. Thirty layers of this prepreg were pressed using the conditions of Example 2 also. The laminate had an areal density of 1.65 psf (8.25 kg/m$^2$). The $V_{50}$ of the laminate was 1978 fps (603 m/s).

EXAMPLE 5

SPECTRA ® 900 yarn, an extended chain polyethylene fiber commercially available from Allied-Signal Corporation, was woven into fabric style 902 (plain weave 17×17 ends/inch). This fabric was then coated with a solution containing about 50.00% by weight AROPOL 7240 (a low viscosity unpromoted isophthalic polyester resin which includes about 35–45% styrene and is commercially available from Ashland Chemicals), 0.01% by weight PEP 308, 0.03% by weight t-butyl-perbenzoate, 24.98% by weight acetone, and 24.98% by weight isopropyl alcohol. The fabric was dried at 75° C. for 45 minutes. The resin content (solids basis) of the prepreg was 20%. The prepreg was weighed before and after drying to confirm that it had no styrene. Thirty (30) layers of this prepreg were pressed (molded) at 220° F. (104° C.), 400 psi (2.75×10$^6$ Pa), for about 10 minutes. The laminate had an areal density of 1.47 psf (7.4 kg/m$^2$). The V$_{50}$ of the laminate was 1846 fps (563 m/s).

EXAMPLE 6

(Comparative)

One hundred (100) parts of AROPOL 7240 were mixed with 0.25 parts of PEP 308 and 0.60 parts of t-butyl-perbenzoate. A wet lay-up process was utilized to wet thirty layers of fabric, construction as in Example 5, with the above mixture. Each layer was wetted prior to superimposing the next fabric layer. The resulting stack of wetted fabric was molded in a press at 220° F. (104° C.) for 10 minutes under pressure of 400 psi (2.75×10$^6$ Pa). Due to heat and pressure from the mold and exotherm due to reaction, a large quantity of resin was squeezed out. The fully cured resin was taken from the press after 10 minutes. The trimmed laminate had an areal density of 1.49 psf (7.45 kg/m$^2$). The V$_{50}$ of the laminate was 1888 fps (576 m/s).

EXAMPLE 7

Example 5 was repeated with the following changes. The coating solution contained 50.00% by weight DERAKANE 411-45, 0.01% by weight PEP 308, 0.03% by weight t-butyl-perbenzoate, 24.98% by weight acetone and 24.98% by weight isopropyl alcohol. Test results were as follows: the laminate had an areal density of 1.49 psf (7.45 kg/m$^2$), and the V$_{50}$ of the laminate was 1836 fps (560 m/s).

EXAMPLE 8

(Comparative)

One hundred (100) parts of vinylester DERAKANE 411-45 were mixed with 0.25 parts of PEP 308 and 0.60 parts of t-butyl-perbenzoate. A wet lay-up process was utilized to wet thirty layers of fabric, constructed as in Example 7, with the above mixture. Each layer was wetted prior to laying the next fabric layer above the wetted layer. The resulting stack of wetted fabrics was molded and the resin cured as in Example 6. The fully cured resin was taken from the press after 10 minutes. The trimmed laminate had an areal density of 1.47 psf (7.35 kg/m$^2$). The V$_{50}$ of the laminate was 1849 fps (563 m/s).

EXAMPLE 9

A fiberglass fabric, Clark Schwebel Style 1800, plain weave 16×14 ends/inch (6.3×5.5 ends/cm) was coated with a solution containing 99.96% by weight AROPOL 7240, 0.01% by weight PEP 308, and 0.03% t-butyl-perbenzoate. The solution was not diluted with a solvent, so that resin pick-up was higher than with ballistic laminates of Examples 5–8. The fabric was dried at 75° C. for 45 minutes. The resin content (solids basis) for this prepreg was 34% by weight. Ten (10) of these prepregs were stacked and molded in a mold 0.12 inch (4.72×10$^{-5}$ m) thick at 220° F. (104° C.) for about 10 minutes. The laminate had a thickness of 0.12 inch (4.72×10$^{-5}$ m). This laminate was tested under flexural mode of loading. The flexural modulus of this laminate was 2.13×10$^6$ PSI and flexural strength was 29.39×10$^3$ PSI. Testing was pursuant to ASTM D-790.

EXAMPLE 10

(Comparative)

99.96% by weight AROPOL 7240 was mixed with 0.01% by weight PEP 308 and 0.03% by weight t-butyl-perbenzoate. A wet lay-up process was utilized to wet ten (10) layers of fabric constructed as in Example 9 with the above mixture. Each layer was wetted prior to superimposing the next fabric layer. The resulting stack of wetted fabrics was molded in a press as in Example 9. The flexural modulus of the laminate was 2.16×10$^6$ PSI and the flexural strength was 38.24×10$^3$ PSI.

EXAMPLE 11

Example 7 is repeated utilizing Kevlar 29 yarn, poly(-phenylenediamine terephthalamide) filaments produced commercially by Dupont Corporation. Shelf life is expected to be at least three months at 25° C. The V$_{50}$ of the laminate is expected to be acceptable.

EXAMPLE 12

Example 2 is repeated utilizing IPN resin, commercially available from Freeman Chemical Corporation. Shelf life is expected to be at least three months at 25° C. The V$_{50}$ of the laminate is expected to be acceptable.

The following is a list further describing some of the compounds used in the above Examples. The resin typically forms about 45 to 65 weight percent of the resin/styrene solution supplied, with styrene making up the balance. The catalyst, with or without promoter, forms about 0.05 to 2 weight percent of that solution.

| Compound | Trade Name | Source | Styrene Content (%) |
|---|---|---|---|
| vinyl ester | DERAKANE 411-45 | Dow Chemical | 45 |
| polyester isophthalic | AROPOL 7240 | Ashland Chemicals | 35–45 |
| resin | IPN | Freeman Chemical | 35–45 |
| promotor | PEP 308 | Air Products and Chemicals | |
| catalyst | t-butyl-perbenzoate | Pennwalt Corp. | |

DISCUSSION

With reference to Examples 1 through 4, it can be seen that the method of the present invention considerably extends the shelf life of prepregs, made by coating with a styrene-containing solution, with no negative effect on ballistic and structural properties of composites comprising the prepregs. Similar results would be expected with each of Examples 5, 7, 9, 11 and 12.

The ballistic performances of the laminates of Examples 5 and 6 (utilizing same fabrics and same resins but different methods of making) were substantially the same. Similar results were obtained in Examples 7 and 8 wherein the resin utilized was a vinyl ester. Large structural, impact and ballistic parts can be molded with the prepregs of the present invention without fear of releasing harmful styrene vapors. The ballistic performance of laminates of Examples 11 and 12 are also expected to be acceptable.

Examples 9 and 11 show that fibers other than polyethylene also work well in this invention.

We claim:

1. An article of manufacture for use in composites comprising at least one network of fibers, each of said networks being impregnated initially with a solution comprising a thermosetting resin, a catalyst, and styrene, said resin being curable by said catalyst at a temperature above about 90°C., said impregnated network being dried for about forty-five minutes or less at a temperature sufficient to reduce the styrene content to less than about 1% by weight of said impregnated network without curing said resin, said dried, impregnated network having a shelf life at about 25° C. of at least about three months.

2. The article of claim 1 wherein said fiber has a modulus of between about 400,000 psi ($2.75 \times 10^9$ Pa) and $100 \times 10^6$ psi ($6.89 \times 10^{11}$ Pa) and a tensile strength of between about 100,000 ($6.89 \times 10^8$ Pa) and 1,000,000 psi ($6.89 \times 10^9$ Pa).

3. The article of claim 2 wherein said fiber is selected from the group consisting of high molecular weight polyethylene, aramids, high molecular weight polypropylene, quartz, graphite, glass, carbon, metals, alumina, nylon, polyester, liquid crystals, polyvinyl alcohol, and combinations thereof.

4. The article of claim 2 wherein said fiber is a high molecular weight polyethylene.

5. The article of claim 2 wherein said fiber is an aramid fiber.

6. The article of claim 1 wherein said resin has a tensile modulus of from between about 5,000 ($3.4 \times 10^7$ Pa) and about 100,000 psi ($6.89 \times 10^8$ Pa).

7. The article of claim 6 wherein said resin is selected from the group consisting of phenolics, polyesters, epoxies, vinyl esters, polyurethanes, polyimides.

8. The article of claim 6 wherein said resin is a polyester resin.

9. The article of claim 6 wherein said resin is a vinyl ester resin.

10. The article of claim 6 wherein said resin is an interpenetrating polymer network resin.

11. The article of claim 1 wherein said catalyst is selected from the group consisting of tert-butyl perbenzoate, 2,5-dimethyl 2,5-di(2-ethyl hexanoyl peroxy)hexane, benzoyl peroxide.

12. The article of claim 1 wherein said dried, impregnated network is essentially track free.

13. The article of claim 1 wherein said solution further comprises a viscosity adjusting solvent other than styrene.

14. The article of claim 1 wherein said impregnated network has been dried for at least about fifteen minutes.

15. The article of claim 13 wherein said other viscosity adjusting solvent is selected from the group consisting of acetone and isopropyl alcohol.

16. The article of claim 1 wherein said impregnated network has been dried at a temperature ranging from 65° to 85°C.

17. The article of claim 7 wherein said resin is selected from the group consisting of polyesters, interpenetrating polymer networks, vinyl esters, polyurethanes and combinations thereof.

18. The article of claim 7 wherein said resin is a interpenetrating network.

* * * * *